United States Patent Office 2,728,220
Patented Dec. 27, 1955

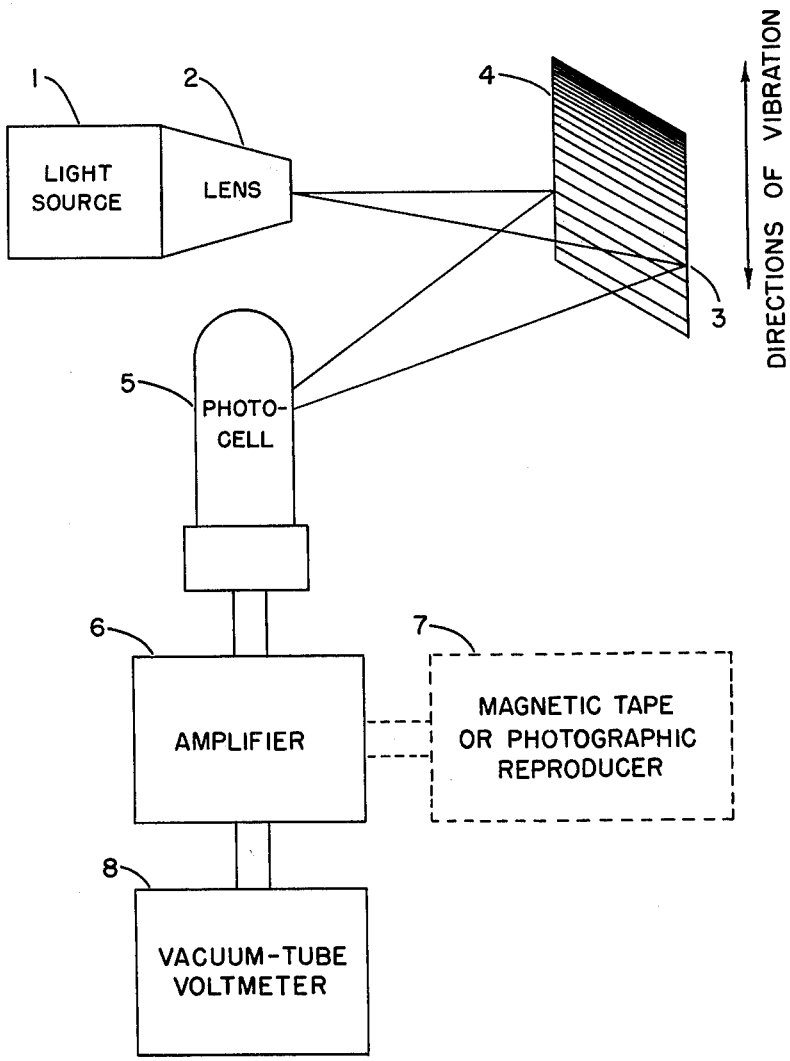

2,728,220

VIBRATION MEASURING APPARATUS

Monroe J. Willner, Sandia Base, Albuquerque, N. Mex., assignor, by mesne assignments, to the United States of America as represented by the United States Atomic Energy Commission Application July 9, 1953, Serial No. 366,980

2 Claims. (Cl. 73—70)

This invention relates to an improved system of apparatus for measuring the excursion from a rest position of a vibrating body. It is often desired to investigate the motion of a massive body forming part of an apparatus set in vibration by a "shake table," for example, and in such cases direct access to the body is difficult. The present invention provides means for measuring the amplitude of the body's vibration regardless of the frequency thereof.

An expedient of the prior art is to make a reference mark on the body and observe this at a distance by means of a cathetometer having a telescope provided with a reference scale on which the mark is focused. Excursions on this scale of the image of the mark are not conveniently observable if the vibration frequency is high, and only in the case of low frequencies is the accuracy of observation satisfactory. The present invention substitutes for the observer's eye an electro-optical system generically related to that used in scanning sound records on film.

A general object of the invention is thus to provide an improved apparatus for measuring vibration.

Another object of the invention is to provide an apparatus for the measurement at a distance of the vibration of a body in oscillation.

Another object is to provide an electro-optical apparatus for such measurement which requires no loading of the body under test.

Another object is to provide a means of permanently recording the vibration wave form.

The invention itself will be clearly understood from the following description of an embodiment thereof, read with reference to the single figure of the accompanying drawing.

In the figure, a light source enclosed in lamphouse 1 is focused by a lens system 2 to form a narrow line of illumination 3 on scale 4. Light source and lens system are conventional, and scale 4 is prepared, either as a photographic film of graded density or a photographic reduction of a large sheet on which lines of varying spacing have been drawn. Scale 4 may also assume the form of a triangular mirror. In any case, it is arranged that the scale show in one direction a linear variation in reflectivity and no variation at right angles thereto. Scale 4 is, for convenience of showing, represented as a draftsman's product to be reduced in size by photography.

Screen 4 is affixed to the body (not shown) whose vibration is to be studied and is illuminated by line of light 3 adjusted to be normal to the direction of vibration. It is to be understood that the drawn lines of the screen, or the lines of constant reflectivity thereon, are likewise normal to the direction of vibration. Source 1 and device 2 may conveniently be of the same type as commonly in use in the recording or reproduction (scanning) of motion picture film sound records; the illustrated arrangement of screen 4 resembles the variable density sound track, but clearly the variable area record may be copied, due precaution being taken that sidewise motion, that is motion in the direction of line 3, is avoided.

A requirement for the variation in density or reflectivity of screen 4 is that between any two vertically separated and parallel lines on the screen there shall be the same arithmetic difference in intensity of reflected light as between any other such two lines equally separated. It will be clear that screen 4 may be mounted for transmission as well as for reflection of light incident upon it in line 3; for convenience, the showing in the figure is that for reflection.

Optical device 2 and source 1 provide a line of illumination on screen 4 which may be observed in any desired manner as the screen vibrates up and down. A convenient way of making these observations is by means of a photoelectric cell 4 receiving light reflected from the screen, which varies in intensity from a maximum to a minimum with motion of the screen. This variation is periodic and is the same in extent wherever the line 3 appears on screen 4 when the latter is at rest, because it has been arranged that the variation in reflectivity of the screen is linear in the direction of vibration. At one or another rest position of line 3 on the screen the average light reflected to cell 5 is not the same, but this determines only the static value of photocell current leaving unchanged the excursions of this current above and below the static value, for equal amplitudes of screen vibration.

A suitable photoelectric tube is the electron multiplier tube 1P21 (which may or may not require a succeeding amplifier 6), the output of which is to be measured by an electrical meter such as vacuum tube voltmeter 8. The output of cell 5 (or of amplifier 6 if the latter is required) may be recorded on a recording device 7 for examination of the wave form of the photocell current and so of the vibration of the body to which screen 4 is fastened. By known means it is possible to insure that the output wave form shall be truly representative of the form of oscillation of screen 4.

The acceleration of the apparatus tested by the "shake table" is related to the double amplitude of the excursion from rest by the following formula when the vibration is a sine wave:

$$a = 0.0511 f^2 D$$

when $a$ = acceleration in G's
$f$ = frequency in cycles per second
$D$ = double amplitude in inches The double amplitude of a low frequency vibration may be determined by use of the cathetometer or other convenient instrument and so the readings of voltmeter 8 may be readily correlated with the physical excursions of the apparatus under test. The use of the present invention adds negligible mass to the vibrating object, avoids electrical and magnetic effects when photocell 5 is properly shielded and ignores shift in the zero line together with vibration at right angles to the direction of interest. It also permits intimate study of the wave form and a means of recording complex types for later analysis.

I claim:

1. Means for measuring the amplitude of vibration of a vibrating object comprising a plane card affixed to the object and having a light reflecting surface of which the reflectivity varies uniformly in the direction of vibration, a source of light, optical means for projecting from the source on the card a line of illumination normal to the card and to said direction, a light-sensitive cell receiving light reflected from the line and producing an output voltage continuously proportional to the intensity of the reflected light thereby producing an alternating voltage proportional in magnitude to the amplitude of vibration and means for indicating the magnitude of the alternating voltage.

2. Vibration measuring means as in claim 1 including means for recording the wave form of the alternating voltage.

References Cited in the file of this patent

UNITED STATES PATENTS

| | | |
|---|---|---|
| 1,794,340 | Parkhurst | Feb. 24, 1931 |
| 2,406,299 | Koulicovitch | Aug. 20, 1946 |
| 2,540,105 | Dunbar et al. | Feb. 6, 1951 |
| 2,596,752 | Williams | May 13, 1952 |